United States Patent
Al-Kateb et al.

(10) Patent No.: US 8,972,381 B2
(45) Date of Patent: Mar. 3, 2015

(54) TECHNIQUES FOR THREE-STEP JOIN PROCESSING ON COLUMN PARTITIONED TABLES

(71) Applicants: Mohammed Al-Kateb, Rolling Hills Estates, CA (US); Grace Kwan-On Au, Rancho Palos Verdes, CA (US); Sanjay Sukumaran, El Segundo, CA (US)

(72) Inventors: Mohammed Al-Kateb, Rolling Hills Estates, CA (US); Grace Kwan-On Au, Rancho Palos Verdes, CA (US); Sanjay Sukumaran, El Segundo, CA (US)

(73) Assignee: Teradata US, Inc., Dayton, OH (US)

( * ) Notice: Subject to any disclaimer, the term of this patent is extended or adjusted under 35 U.S.C. 154(b) by 106 days.

(21) Appl. No.: 13/726,967

(22) Filed: Dec. 26, 2012

(65) Prior Publication Data

US 2014/0181077 A1    Jun. 26, 2014

(51) Int. Cl.
*G06F 17/00* (2006.01)
*G06F 17/30* (2006.01)

(52) U.S. Cl.
CPC .............................. *G06F 17/30466* (2013.01)
USPC ............. 707/714; 707/713; 707/758; 706/12; 706/14; 706/45

(58) Field of Classification Search
None
See application file for complete search history.

(56) References Cited

U.S. PATENT DOCUMENTS

| | | | |
|---|---|---|---|
| 5,548,758 A | 8/1996 | Pirahesh et al. | |
| 6,374,235 B1 | 4/2002 | Chen et al. | |
| 6,446,063 B1 | 9/2002 | Chen et al. | |
| 7,203,686 B1* | 4/2007 | Sinclair et al. | 1/1 |
| 7,366,716 B2* | 4/2008 | Agrawal et al. | 1/1 |
| 7,966,343 B2* | 6/2011 | Yang et al. | 707/791 |
| 8,396,865 B1* | 3/2013 | Ie et al. | 707/723 |
| 2003/0074348 A1* | 4/2003 | Sinclair et al. | 707/2 |
| 2005/0091238 A1* | 4/2005 | Zane et al. | 707/100 |
| 2006/0253473 A1* | 11/2006 | Agrawal et al. | 707/100 |
| 2009/0063527 A1* | 3/2009 | Corvinelli et al. | 707/101 |
| 2009/0150336 A1* | 6/2009 | Basu et al. | 707/2 |
| 2009/0254516 A1* | 10/2009 | Meiyyappan et al. | 707/2 |
| 2009/0254532 A1* | 10/2009 | Yang et al. | 707/4 |
| 2010/0088309 A1 | 4/2010 | Petculescu | |
| 2011/0246432 A1* | 10/2011 | Yang et al. | 707/693 |
| 2012/0166400 A1* | 6/2012 | Sinclair et al. | 707/692 |
| 2012/0166402 A1* | 6/2012 | Pederson et al. | 707/692 |
| 2012/0311709 A1* | 12/2012 | Kang et al. | 726/24 |
| 2014/0006380 A1* | 1/2014 | Arndt et al. | 707/714 |
| 2014/0172898 A1* | 6/2014 | Aguilera et al. | 707/759 |

* cited by examiner

*Primary Examiner* — Hung Le
(74) *Attorney, Agent, or Firm* — Schwegman, Lundberg & Woessner, P.A.

(57) ABSTRACT

Techniques for processing joins on column partitioned tables are provided. A query includes a first-Column Partition (CP) table joined with a second-CP table. The query is decomposed into a three-step process and rewritten and processed.

14 Claims, 4 Drawing Sheets

TECHNIQUES FOR THREE-STEP JOIN PROCESSING ON COLUMN PARTITIONED TABLES

BACKGROUND

A database join operation combines records from more than one database table. A join essentially creates a set that can be saved as its own independent database table. There are a variety of types of joins.

One type of join is called inner join. An inner join creates a common results table from two tables by combining common values from the two tables via a join predicate. Another type is outer join. An outer join does not require each record in the two joined tables to have a corresponding matching record. The resulting joined table retains each record, even if no other matching record exists. Outer joins may be subdivide further into left outer joins, right outer joins, and full outer joins, depending on which table(s) the rows are retained from, such as left, right, or both. A left outer join retains all records from the left table regardless of matching and retains only matching records from a right table. Conversely, a right outer join retains all records from a right table regardless of matching and retains only matching records from the left table. A full outer join includes records from both the left and right tables regardless of matching.

Traditionally, databases have been partitioned based on rows (sometimes referred to as "horizontal partitioning"). However, recently databases have permitted partitioning based on columns (also referred to as "vertical partitioning").

Vertical partitioning for database tables and join indexes is a powerful physical database design choice that has only recently been made available in the industry. A key advantage of column partitioning is to reduce the Input/Output (I/O) cost of accessing the underlying database objects by eliminating unnecessary access to columns that are not referenced in a given query in the projection list, join conditions, and/or elsewhere.

Since the cost of a join operation over column partitioned ("column partition" is herein referred to as "CP") objects is usually a dominate factor in the overall cost of answering a given join query, optimizing join processing over CP objects is crucial to the query performance.

Join processing on a column-partitioned table for a parallel system can be done by duplicating or redistributing the other table on every Access Module Processor (AMP); by duplicating; or redistributing the column-partitioned table across all the AMPs. If the other table is duplicated, the column-partitioned table can be directly accessed in the join operation, in which case, the join columns in the column-partitioned table are accessed first to evaluate the join conditions. The remaining columns are accessed only for rows that satisfy the join conditions. Therefore for a join that qualifies a relatively small number of rows, duplicating the other table to directly join with the column-partitioned table can also achieve good Input/Output (I/O) reduction. However, when the other table is too large to be duplicated, the column-partitioned table will need to be duplicated or redistributed into a spool file to do the join. Conventionally, any time it is necessary to spool a column-partitioned table for a join operation, all the columns that are referenced by a given query are read and output to a spool file. This incurs un-necessary I/O in reading the non-join columns for rows that are not going to qualify for the join conditions, which is inefficient.

Moreover, large scale databases include query optimizers (may also be referred to as "database optimizers") that determine a most efficient way to execute a query by considering multiple different query plans and the cost of each individual query plan. However, because conventional row-based database systems generally process joins with the assumption that there is very little overhead to access columns with a row once a row has been read, column-level options are not used by query optimizers in making query plan decisions for joins on CP tables.

SUMMARY

In various embodiments, techniques for processing joins on column partitioned tables are presented. According to an embodiment, a method for join processing on column partitions of a database is provided.

Specifically, a query is received having a join operation on a first-column partitioned (CP) table and a second-CP table. A join condition is processed for the join operation on the first-CP table and the second-CP table to produce a first temporary table that satisfies the join condition. Next, a rowid join is performed on the first-CP table and the first temporary table to produce a second temporary table. Finally, the second temporary table and the second-CP table are joined, via the rowid join, to produce a results table for the query.

DETAILED DESCRIPTION

Figure 1:
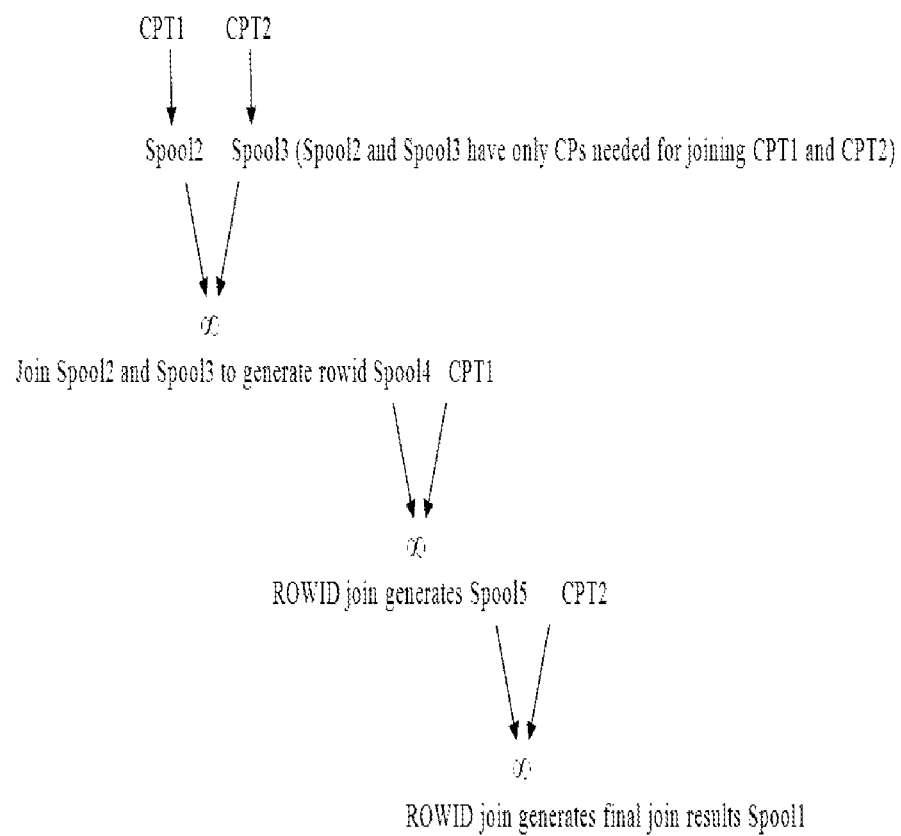
FIG. 1 is an illustration for a three-step join processing over column partitions of CP tables, according to an example embodiment.

FIG. 1 is an illustration for a three-step join processing over column partitioned tables, according to an example embodiment. The diagram shows processing occurring in three join steps. Moreover, the diagram is best understood with the following example scenario:

```
CREATE TABLE CPT1
(a1 INTEGER
, b1 INTEGER
, c1 INTEGER
, d1 INTEGER
, e1 INTEGER)
NO PRIMARY INDEX,
PARTITION BY COLUMN;
CREATE TABLE CPT2
(a2 INTEGER
, b2 INTEGER
, c2 INTEGER
, d2 INTEGER
, e2 INTEGER)
NO PRIMARY INDEX,
PARTITION BY COLUMN;
SELECT a1
    ,b1
    ,a2
    ,b2
FROM CPT1,CPT2
WHERE c1=c2;
``` where CPT1 and CPT2 are column partitioned tables.

The three-step join process as shown and discussed below with reference to the FIG. 1. Specifically, to address this CP-to-CP join, the underlying approach is to spool only columns needed for join from both CPT1 and CPT2 instead of spooling all of the columns referenced in the query from both CP tables.

The three-step CP join optimization with nested join breaks down the first step into a two-step nested join with some differentiation.

So, with the proposed optimization, the above query (presented with the FIG. 1A) is executed in three steps—generating a plan similar to the following:

The preprocessing step of this plan spools only CPs needed to join CPT1 and CPT2. in Spool 2 and Spool 3. respectively. The first join step picks the best join plan to join Spool 2 and Spool3. and generates a ROWID Spool 4. The second join step is a ROWID join step, which joins back the ROWID Spool 4 with CPT1 (accessing the remaining CPs referenced in the query from CPT1). The outcome of the second step is a ROWID spool 5. In the third join step, the ROWID spool 5 is used to join back to CPT2 (accessing the remaining CPs referenced in the query from CPT2) using ROWID join. The outcome of this third step is Spool 1 containing the join result between CPT1 and CPT2.

For the three-step CP join with nested join, the first step is a nested join between the two CP tables such that one of the table is accessed using an index to extract ROWIDs and build ROWID spool. The second and third steps are ROWID join steps similar to the case of CP-to-CP join.

The proposed three-step CP join optimization has the following advantages. First, since an optimizer follows a cost-based optimization scheme, the optimizer can cost the potential three-step CP join and decide whether it is the best plan to use. Second, if the three-step CP Join plan were to be picked, it can provide considerable performance improvement, especially if it is too expensive to spool column partitions from CP objects that are not needed for join. Third, the proposed CP join optimization is an extension of the current infrastructure that supports the planning, costing and statement building of CP join processing.

So, the following are the advantages of the proposed technique presented herein:

the technique results in a more query optimal plan for join queries over CP tables;

the optimized plan has a considerable performance improvement for a wide range of join queries over CP tables; and the proposed technique is directly implemented as an enhancement to current database infrastructures for query optimizers that use costing and planning metrics.

Figure 2:
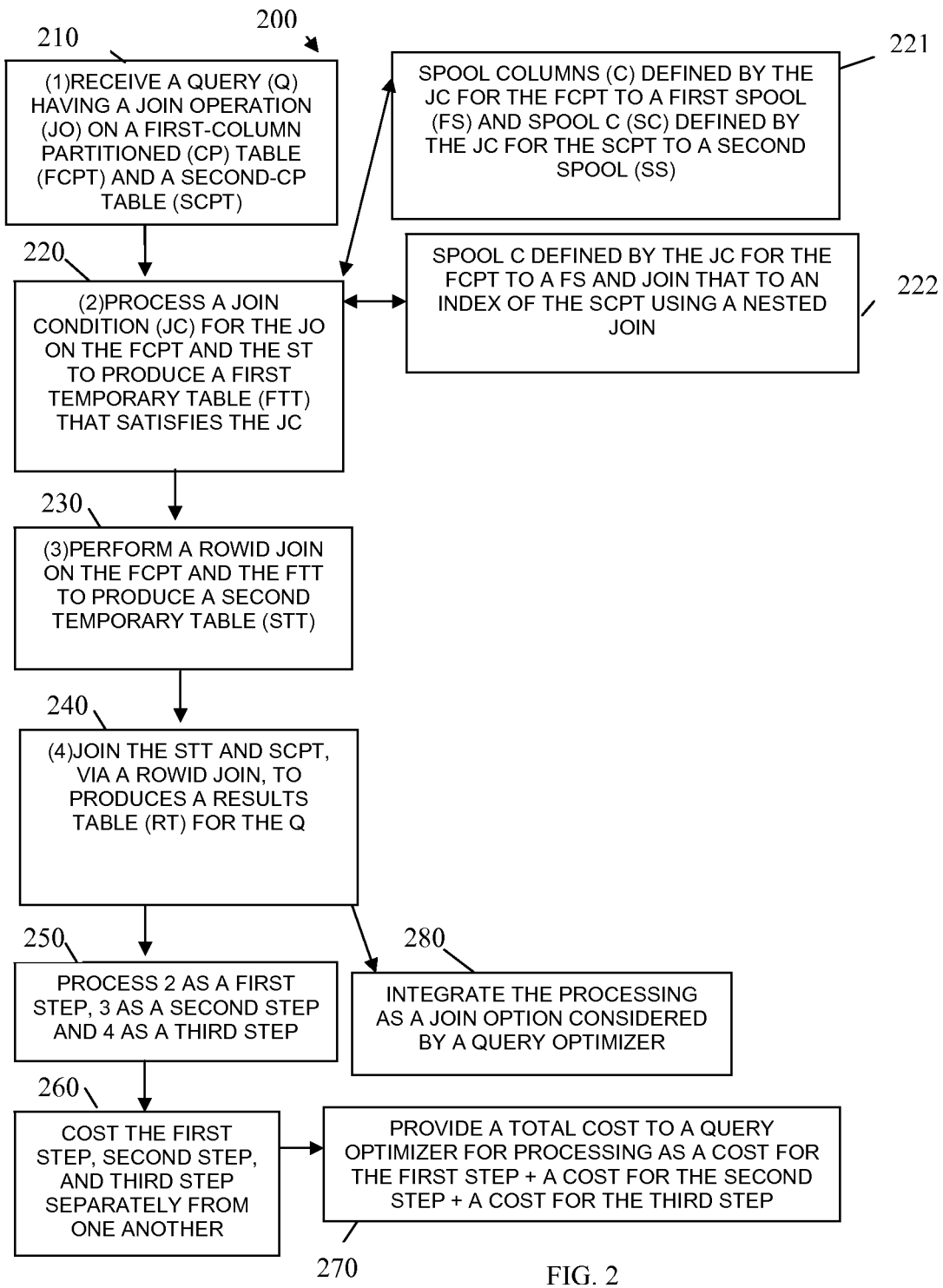
FIG. 2 is a diagram of a method for join processing over column partitions of CP tables, according to an example embodiment.

FIG. 2 is a diagram of a method 200 for join processing over column partitioned tables, according to an example embodiment. The method 200 ("join manager") is implemented, resides, and is programmed within memory and/or a non-transitory computer-readable storage medium as executable instructions that execute on one or more processors of a network and the network is wired, wireless, or a combination of wired and wireless.

At 210, the join manager receives a query having a join operation on two (CP) tables. The entire join manager may be embedded in a query optimizer or may be an external service to the query optimizer or part of the search logic for a database system, such that receipt of the query and scanning the query for the join operation on the first-CP table and the second-CP table is not an issue. Other techniques for scanning and recognizing portions of the query may be used as well in other embodiments.

At 220, the join manager processes a join condition for the join operation on the two CP tables to produce a first temporary table that satisfies the join condition. This was discussed above in detail and sample SQL for a sample scenario was provided (discussed as spools in the FIG. 1).

According to an embodiment, at 221, the join manager spools the columns defined by the join condition for the first-CP table to a first spool and spools columns defined by the join condition for the second-CP table to a second spool.

In an embodiment, at 222, the join manager spools columns defined by the join condition for the first-CP table to a first spool and joins that to an index of the second-CP table using a nested join.

At 230, the join manager performs a rowid join on the first-CP table and the first temporary table to produce a second temporary table. This was presented above in the FIG. 1.

At 240, the join manager joins the second temporary table and the second-CP table, via a rowid join, to produce a results table for the query.

In an embodiment, at 250, the join manager processes 220 as a first step, 230 as a second step, and 240 as a third step.

Continuing with the embodiment of 250 and at 260, the join manager costs the first step, the second step, and the third step separately from one another.

Still continuing with 260 and at 270, the join manager provides a total cost to a query optimizer for the processing as a cost for the first step plus a cost for the second step plus a cost for the third step.

In an embodiment, at 280, the join manager's processing is integrated as a join option considered by a query optimizer.

Figure 3:
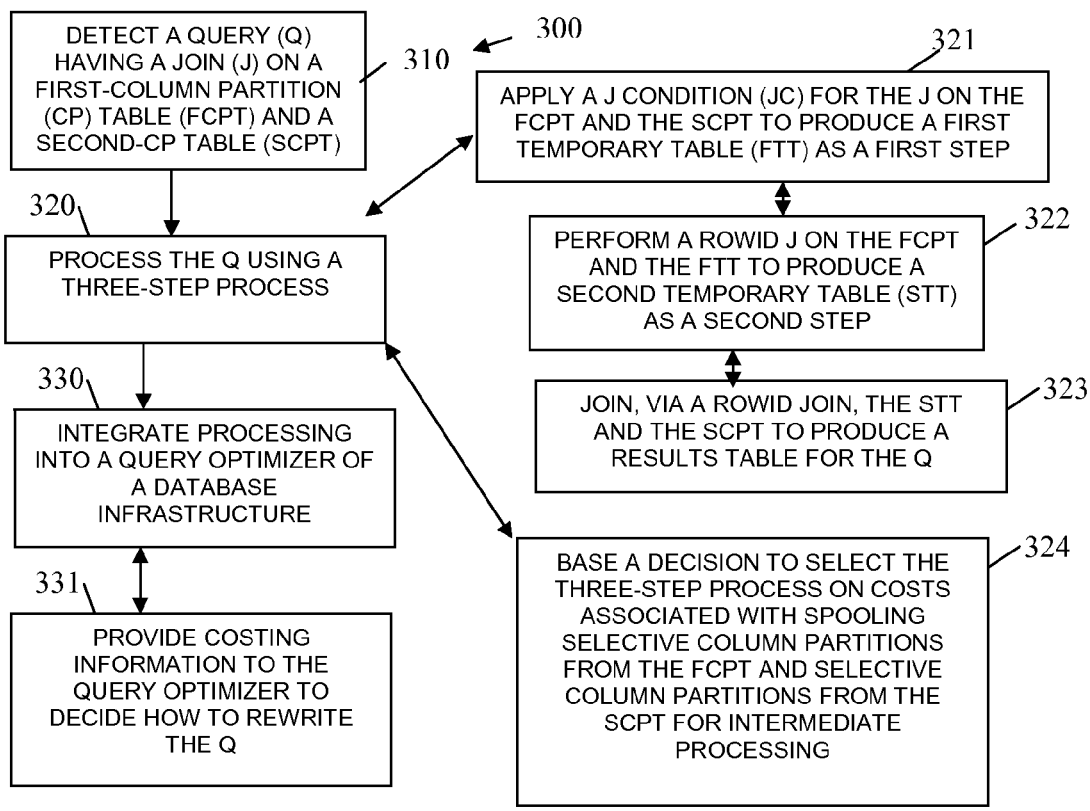
FIG. 3 is diagram of another method for join processing over column partitions of CP tables, according to an example embodiment.

FIG. 3 is diagrams of another method 300 for join processing over column partitioned tables, according to an example embodiment. The method 300 (hereinafter referred to as "join controller") is implemented, resides, and is programmed within memory and/or a non-transitory computer-readable storage medium as executable instructions. The instructions are processed on one or more processors of the network and the network is wired, wireless, or a combination of wired and wireless.

The join controller presents another and in some cases enhanced perspective of the join manager represented by the FIG. 1.

At 310, the join controller detects a query having a join on a first-CP table and a second-CP table. This is similar to what was discussed above in detail with the FIG. 1.

At 320, the join controller processes the query as a three-step process.

According to an embodiment, at 321, the join controller applies a join condition for the join on the first-CP table and the second-CP table to produce a first temporary table in the three-step process.

Continuing with the embodiment of 321 and at 322, the join controller performs a rowid on the first-CP table and the first temporary table to produce a second temporary table as a second step in the three-step process.

Still continuing with the embodiment of 322 and at 323, the join controller joins, via a rowid join, the secondary temporary table and the second-CP table to produce a results table for the query.

According to an embodiment, at 324, the join controller bases a decision to select the three-step process on costs associated with spooling the selective column partitions from the first-CP table and selective column partitions from second-CP table for intermediate processing.

In an embodiment, at 330, the join controller is integrated into the processing of a query optimizer for a database infrastructure.

Continuing with the embodiment of 330 and at 331, the join controller provides costing information to the query optimizer to decide on how to rewrite the query.

Figure 4:
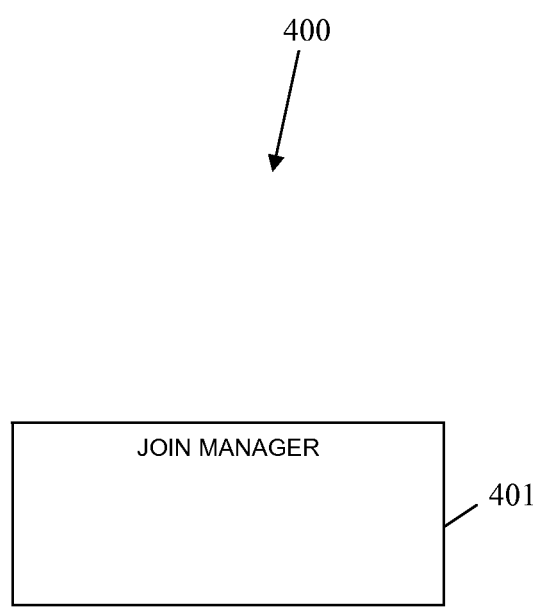
FIG. 4 is a diagram of a column partition join processing system, according to an example embodiment.

FIG. 4 is a diagram of a column partition join processing system 400, according to an example embodiment. Components of the column partition join processing system 400 are implemented and programmed within memory and/or non-transitory computer-readable medium and executed by one or more processors of a network, and the network is wired, wireless, or a combination of wired and wireless.

The column partition join processing system 400 includes a join manager 401.

The one or more processors of the column partition join processing system 400 include memory having the join manager 401. The one or more processors execute the join manager 401. Example processing associated with the join manager 401 was presented above in detail with reference to the FIGS. 1-3.

The join manager 401 is configured to decompose a join operation on a first-column partition (CP) table and a second-CP table in a query into a three-step process and permit each step to have resolved costs for selecting a query execution for the query.

According to an embodiment, the join manager 401 is configured to provide the three-step process to an optimizer to provide back the costs and the selected query execution.

In an embodiment, the join manager 401 is also configure to provide a first step that performs a join on the first-CP table and the second-CP table retaining just columns defined by the join for both the first-CP table and the second-CP table. The join manager 401 is further configured to provide a second step that rowid joins the columns from the join back to remaining columns in the first-CP table. Furthermore, the join manger 401 is configured to provide a third step that rowid joins intermediate results back to other remaining columns in the second-CP table.

In an embodiment, the join manager 401 is provided as a feature to a query optimizer.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within memory or a non-transitory computer-readable storage medium and processed by one or more processors, the processors configured to execute the method, comprising:
   (1) receiving, via the processor, a query having a join operation on first-column partitioned (CP) table and a second-CP table;
   (2) processing, via the processor, a join condition for the join operation on the first-CP table and the second-CP table to produce a first temporary table that satisfies the join condition;
   (3) performing, via the processor, a rowid join on the first-CP table and the first temporary table to produce a second temporary table; and
   (4) joining, via the processor, the second temporary table and the second-CP table, via the rowid join, to produce a results table for the query.

2. The method of claim 1 further comprising, processing, via the processor, (2) as a first step, (3) as a second step, and (4) as a third step.

3. The method of claim 2, wherein processing further includes costing the first step, the second step, and the third step separately from one another.

4. The method of claim 3, wherein costing further includes providing a total cost to a query optimizer for the method as a cost for the first step plus a cost for the second step plus a cost for the third step.

5. The method of claim 1 further comprising, integrating the method as a join option considered by a query optimizer.

6. The method of claim 1, wherein processing further includes spooling columns defined by the join condition for the first-CP table to a first spool and spooling columns defined by the join condition for the second-CP table to a second spool.

7. The method of claim 1, wherein processing further includes spooling columns defined by the join condition for the first-CP table to a first spool and joining that to an index of the second-CP table using a nested join.

8. A method implemented and programmed within memory or a non-transitory computer-readable storage medium and processed by a processor, the processor configured to execute the method, comprising:
   detecting, via the processor, a query having a join on a first-column partition (CP) table and a second-CP table;
   processing, via the processor, the query using a three-step process;
   integrating the method processing into a query optimizer of a database infrastructure; and
   applying a join condition for the join on the first-CP table and the second-CP table to produce a first temporary table as a first step in the three-step process.

9. The method of claim 8, where integrating further includes providing costing information to the query optimizer to decide on how to rewrite the query.

10. The method of claim 8, wherein applying further includes performing a rowid join on the first-CP table and the first temporary table to produce a second temporary table as a second step in the three-step process.

11. The method of claim 10, wherein performing further includes joining, via a rowid join, the secondary temporary table and the second-CP table to produce a results table for the query.

12. The method of claim 8, wherein processing further includes basing a decision to select the three-step process on costs associated with spooling selective column partitions from the first-CP table and selective column partitions from the second-CP table for intermediate processing.

13. A system, comprising:
   memory configured with a join manager that executes on a processor;
   wherein the join manager is configured to decompose a join operation on a first-column partition (CP) table and a second-CP table in a query into a three-step process and permit each step to have resolved costs for selecting a query execution for the query;
   wherein the join manager provides the three-step process to an optimizer to provide back the costs and the selected query execution; and
   wherein the join manager is configured to provide a first step that performs a join on the first-CP table and the second-CP table retaining just columns defined by the join for both the first-CP table and the second-CP table; the join manager is further configured to provide a second step that rowid joins the columns from the join back to remaining columns in the first-CP table; and the join manger is configured to provide a third step that rowid joins results back to other remaining columns in the second-CP table.

14. The method of claim 13, wherein the join manager is provided as a feature to a query optimizer.

* * * * *